Figure 1:
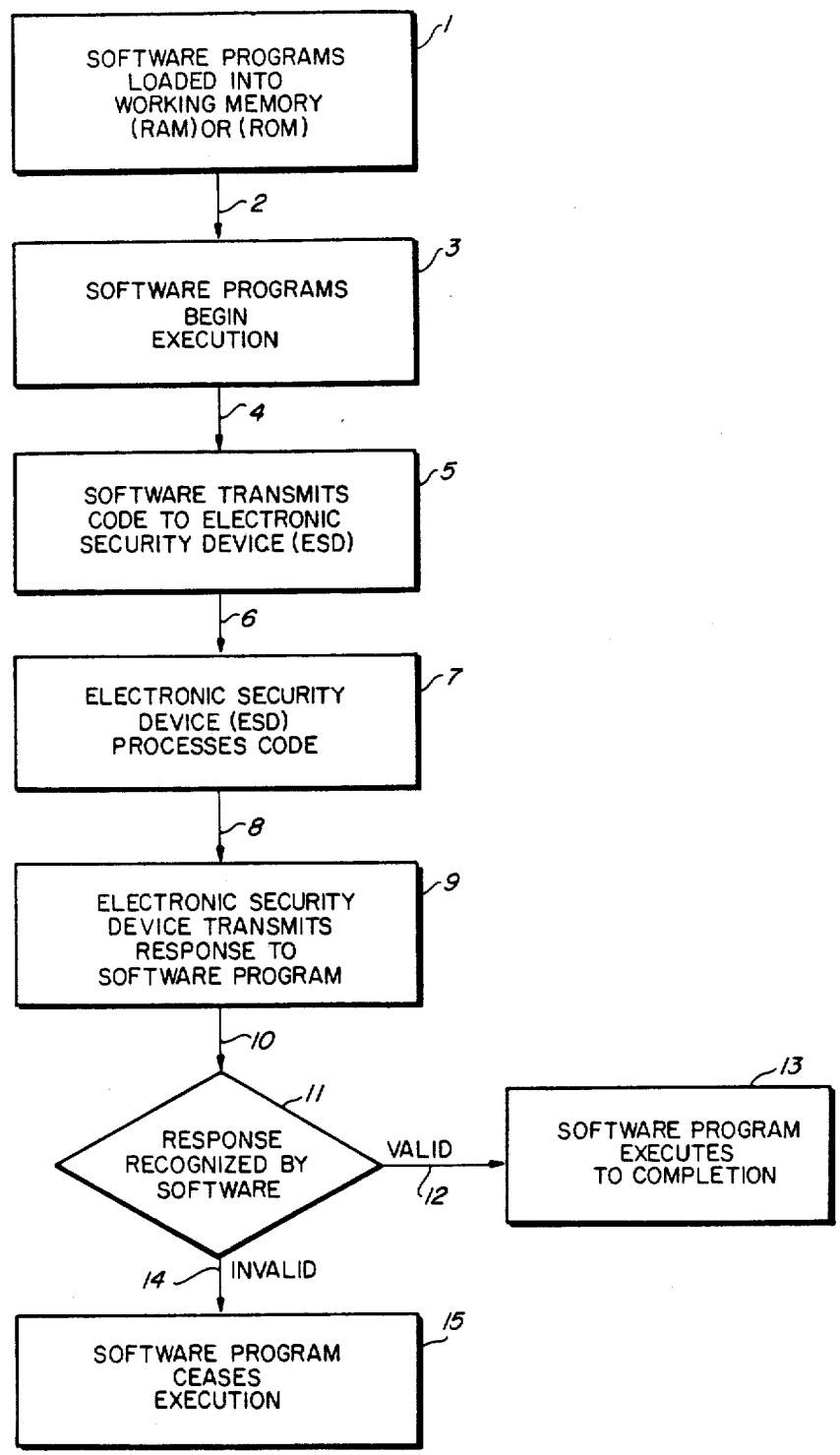

United States Patent [19]

Thomas

[11] Patent Number: 4,654,792
[45] Date of Patent: Mar. 31, 1987

[54] DATA PROCESSING SYSTEM INCLUDING DATA INPUT AUTHORIZATION

[75] Inventor: David C. Thomas, Mesa, Ariz.

[73] Assignee: Corban International, Ltd., Anguilla, British West Indies

[21] Appl. No.: 605,298

[22] Filed: Apr. 30, 1984

Related U.S. Application Data

[63] Continuation of Ser. No. 266,724, May 26, 1981, Pat. No. 4,446,519.

[51] Int. Cl.[4] ............................................. G06F 3/00
[52] U.S. Cl. .................................................. 364/200
[58] Field of Search ... 364/200 MS File, 900 MS File

[56] References Cited

U.S. PATENT DOCUMENTS 4,264,782  4/1981  Konheim ..................... 364/200 X Primary Examiner—Raulfe B. Zache
Attorney, Agent, or Firm—William H. Drummond

[57] ABSTRACT

A data processing system includes means for verifying the authority of data-entry devices to input data and the authenticity of such data. The system includes a central data-processing computer, a plurality of data-entry devices connected to the central computer for providing input data, a central security system, connected to the central computer for identifying the data-entry devices and verifying that such devices are authorized to input data, and a programmable external security device connected to at least one of said authorized data-entry devices. The external security device is programmed by the central security system to exchange user-identifier and user transaction-related data with this data-entry device and with the central security system.

1 Claim, 2 Drawing Figures

DATA PROCESSING SYSTEM INCLUDING DATA INPUT AUTHORIZATION

This application is a continuation of Ser. No. 266,724, filed May 26, 1981, now abandoned.

This invention concerns methods and apparatus for providing computer security.

In one aspect, the invention concerns methods and apparatus for providing security for computer software.

In another aspect the invention concerns methods and apparatus for verifying the authenticity of data input to a computer.

More particularly, the invention pertains to such methods and apparatus useful in the practice thereof which permit a software manufacturer to give its customer the right to make unlimited copies of a software program, which the customer can then use as backups on its own computer, but which does not permit the customer to make copies of the software which can be used in the operation of a computer belonging to an unauthorized third party.

In still another respect, the invention pertains to computer software security systems which, optionally, can be provided with the capability of destroying programs which are being surreptitiously used.

In yet another respect, the invention pertains to improved computer systems which have the capability of verifying the authenticity of input data utilizing an external security device which is programable by the security system of a central computer having a plurality of data entry devices.

With the advent of relatively low-priced computers, the market for compatible software has burgeoned. The present sales volume of microcomputer software publishers is estimated at several hundred million dollars per year with significant increases projected for a potentially indefinite period.

With this demand for software has come a similarly significant increase in the number of instances in which legitimate purchasers of the software from a particular source make unauthorized copies and sell them or give them to third parties, thus depriving the software publishers of a significant increment of income. Present estimates place the lost sales from software piracy at upwards of 20% of the total expected sales volume.

Until recently, the unauthorized copying of software was limited to instances where sophisticated computer programming and electronics experts were able to outwit the available protection schemes. However, more recently, programs which permit relatively unskilled persons to circumvent prior art security measures have been developed. Within the last year, at least five programs have come onto the market which enable the buyers to duplicate supposedly protected software. These so-called "copy-all" programs enable the purchaser thereof to copy any program which is compatible with his hardware, even though the copied program contains elaborate internal security measures.

The copied programs can then, in turn, be re-copied ad infinitum and, with the advent of national software communication systems, it is entirely possible for a particular program to be copied at one location and distributed overnight to thousands of additional unauthorized users.

There is, however, a sound reason why a software manufacturer would be well advised to give his customer the right to make unlimited copies of a program which the customer has legitimately purchased from the publisher. If the permanent memory device which contains the program is lost or mechanically or electronically damaged or destroyed, it may take up to several weeks for the publisher to replace it and, in the meantime, the customer has no use of his computer for the purpose of the particular program involved. In a sense, then, the publishers themselves are encouraging their own legitimate customers to make pirate copies of the software to avoid the damaging or potentially disastrous results of loss of use of the program for significant time periods.

A related problem exists when the program publisher finds a "bug" in the program. If typical prior art security measures have been built into the program and/or hardware, it may take up to several weeks to distribute de-bugged authorized copies of the program. Again, such delays can cause disastrous damage to the publisher's customers.

According to the present state of the art, the closest approach to achieving reliable software security has involved providing the customer with a circuit board having a memory with a pre-stored serial number. The software checks the board for this serial number and, if the serial number is incorrect, the program cannot be executed by the computer Although this system is partially effective, it is possible to circumvent these security precautions by straightforward programming techniques. Further, the cost of preparing each software package is increased because of the need to provide each program with a particular serial number identifying the customer's computer. Additionally, if de-bugging of a program is required, the publisher must send each customer a new software package, each of which contains that particular customer's unique serial number.

Accordingly, it would be highly desirable to provide a computer software security system in which each customer is allowed to make unlimited copies of his legitimately purchased software package but in which such copies could not be used on computers belonging to unauthorized third parties.

Further, it would be highly desirable to provide such a software security system which cannot be circumvented by normal programming techniques and which allow the publisher to "mass produce" software packages because they do not contain serial numbers which are unique to each particular customer.

Accordingly, the principal object of the present invention is to provide an improved computer software security method and apparatus useful therein.

Yet another object of the invention is to provide such methods and apparatus which enable the software publisher to better service the needs of his legitimate customers by allowing them to make unlimited backup copies of programs purchased from him and by simplifying de-bugging procedures.

Yet another object of the invention is to provide a computer software security system which, optionally, has the capability of actually destroying or otherwise rendering inoperative software which is being surreptitiously copied or used.

Another aspect of the general problem of providing computer security is the need to verify the authenticity of data input to a central computer from a plurality of data entry devices which may be physically located at widely spaced geographic locations. Familiar examples include robot teller systems employed by banks at branches and various public locations which enable the bank's customer to transact business without the assistance of a human teller and at locations other than inside the bank branches. Such systems also include systems which allow retail stores to sell merchandise to the customers of many different banks in which charges against the customers' accounts are made at the retail store location by entering account and amount information at a single data entry device connecting with the central computers of a plurality of banks. Other examples of such systems will readily occur to those skilled in the art.

According to the present state of the art, the closest approach to achieving reliable input data verification is the use of a credit card device carrying pre-programmed account identification data. Such cards are issued to the bank's authorized customers who then use them to transact personal banking business through robot tellers or retail store data entry devices. One of the main problems encountered in such systems is that data can sometimes be transmitted to the bank's central computer from unauthorized data entry devices. Accordingly, it would be highly desirable to provide a system in which the credit card forms a link in a two-way communication channel which permits the security system of the central computer to verify not only the authenticity of the data input, but also the authenticity of the data entry device. Accordingly, one of the principal objects of the present invention is to provide an improved computer system which includes means for verifying the authenticity of input data and the authenticity (authorized status) of the external data input device being used to input the data.

Figure 2:
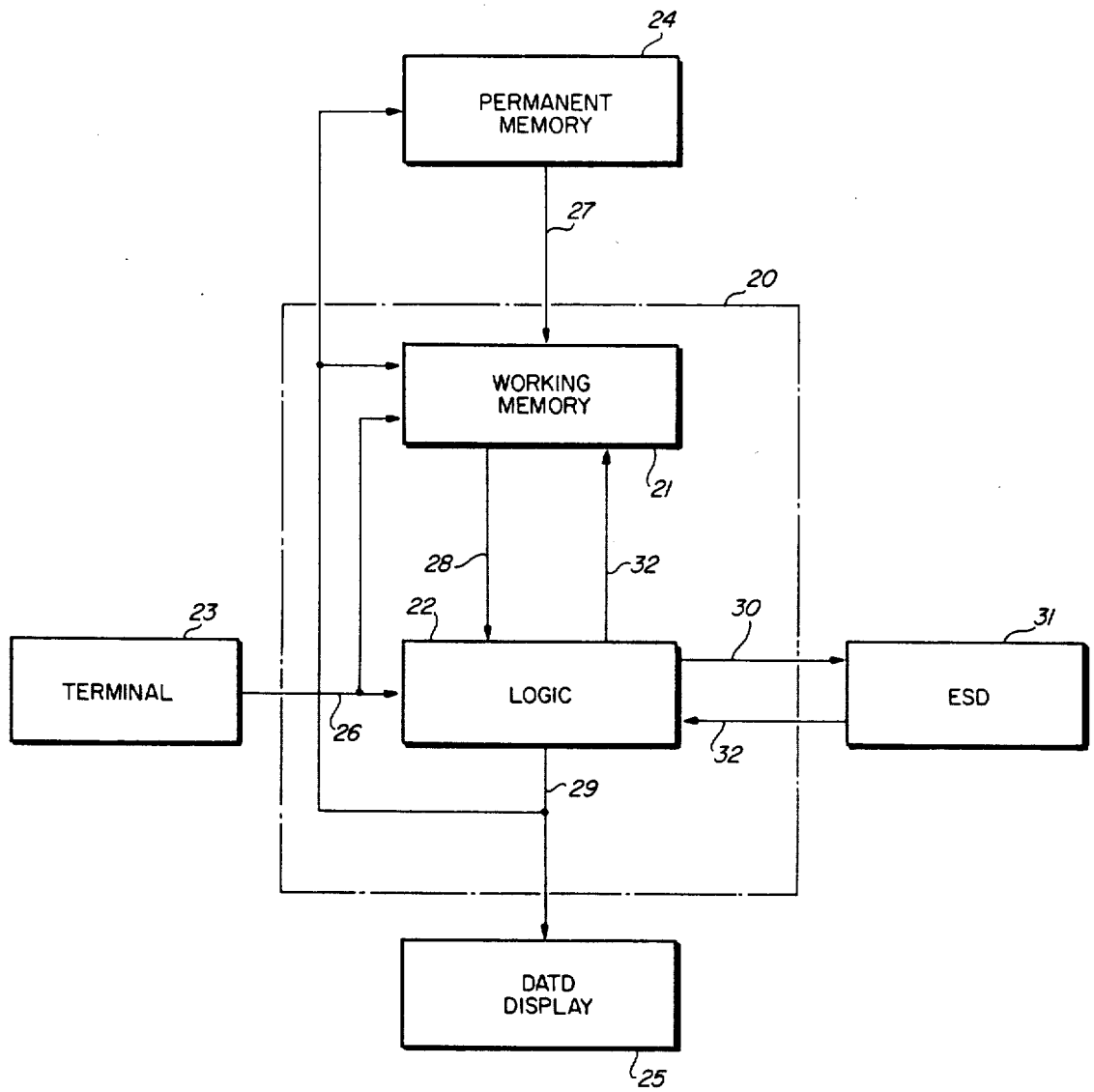

These and other, further and more specific objects and advantages of the invention will be apparent to those skilled in the art from the following detailed description thereof, taken in connection with the drawings, in which:

FIG. 1 is a flow chart which schematically depicts the method of the invention; and FIG. 2 is a block diagram illustrating the interrelationship of the various components of computer systems which employ the invention.

The objects and advantages of the invention are achieved by providing each legitimate purchaser of a software package with an electronic security device ("ESD"), preferably in the form of a plug-in circuit board element, along with each legitimately purchased software package. The ESD and the software package are programmed to establish 2-way communication. When the program, contained in a permanent memory device such as a disc or tape, is loaded into the working memory (RAM or ROM) of the computer and the program sequence is commenced, the software generates coded interrogation signals which are transmitted to the ESD. If the ESD is the correct one which has been furnished to the purchaser along with the program, the ESD will recognize the interrogation signals and transmit proper coded response signals to the working memory of the computer. If and only if the software in the working memory receives the proper response signal from the ESD, the software will then generate command signals to the computer which cause execution of the program. If the proper response signals are not received by the working memory containing the software program, the command signals are not generated and the program cannot be executed by the computer. According to a further embodiment of the invention, the failure to receive the proper response signals from the ESD can even require that the program in the working memory be erased or scrambled in a fashion that does not even permit the program pirate to determine the nature of the incorrect response signal.

If a program publisher provides a plurality of separate programs to its customers, a separate attachment to the ESD is supplied to each customer along with the purchased copy of each particular program. Each of the program packages of a specific type, e.g., general ledger, accounts receivable, etc., contain standard interrogation and response assessment instructions and an additional interrogation and response assessment for the separate attachment. Thus, each customer can make backup copies of each program and can run the copies on his computer containing or connected to the particular electronic security device which he was furnished along with his original legitimately purchased software package. However, the copies cannot be run on a computer which does not have or is not associated with the proper ESD attachment. Other purchasers of the same program from the same publisher could use the copies if they had the ESD attachment furnished by the publisher with that particular package, but there would be no incentive for one legitimate purchaser to buy copies of that program from another legitimate purchaser because he can make them for himself without cost. On the other hand, a customer which had not obtained a legitimately purchased package along with the ESD attachment for that package could not utilize copies made by a legitimate purchaser because he does not have the proper ESD attachment.

While it might be theoretically possible to make illegitimate copies of the ESD, the cost, time and complexity of discovering the program in the ESD would be prohibitive in comparison to purchasing legitimate copies of the program from the publisher. Furthermore, the program in the ESD can be changed at random times to further discourage such practices. Thus, in comparison to the serial number special circuit boards supplies each customer according to the prior art, which are comparatively simple to reproduce, the system of the present invention in which the ESD for any particular program is the same for each customer (but contains nearly undecipherable logic) offers a much higher degree of security.

To achieve the desired reliable input data verification, the external security device is constructed to be programable by the security system associated with the central computer. The ESD is programmed so as to be capable of exchanging programmed user-identifier data and user-transaction related data with authorized data entry devices and with the central security system. For example, the ESD can be constructed so as to carry a PROM embedded in a card-like structure. The terminals of the PROM are connected with spaced conductive portions carried in the surface of the card which register with and electrically interconnect with corresponding conductors carried by the data entry devices. Upon insertion of the card into the data entry device, the registered conductive portions of the card make electrical contact with the conductors carried by the data entry device, thus interconnecting the ESD in the central computer system/data entry device card.

In accordance with the invention, prior to the issuance of the ESD to the user, the PROM is programmed with user-identifier data and, for example, with account history data and other user-specific information, for example, credit limits, etc. Additionally, the PROM is programmed to exchange this data only with preauthorized programmed data entry devices and to cause the data entry devices to generate random codes which can be matched with similar random codes generated by the central security system to simultaneously verify the authenticity of the ESD and the data entry device, according to techniques which are well-known in the art.

Briefly, in accordance with the invention, I provide both methods and apparatus useful therein which operate and are constructed in accordance with the foregoing general description.

According to the method of the invention, I provide security for software used in a computer which includes a working memory and a program stored in the memory, which method includes, in combination, the steps of: loading a program into said working memory which includes instructions for generating preselected coded interrogation signals, assessing response signals thereto, and generating command signals according to preselected security criteria. After execution of the program has commenced, coded interrogation signals are transmitted from the working memory to the electronic security device which automatically processes the received signals and generates a coded response thereto. The coded response signals are transmitted back to the working memory and, if the response signal satisfies the preselected security criteria, the working memory generates a command signal which causes the computer to complete the execution of the program.

According to another embodiment of the invention, apparatus is provided for use in a computer system which includes a permanent memory having a software program, a program stored in said permanent memory, a computer having a working memory and means for loading the program into the working memory. In combination with these elements, I provide means for securing the software from use by an unauthorized computer, which means include, in combination, means in said software program for generating a predetermined coded signal and for assessing response signals according to predetermined security criteria, means operatively associated with the computer for receiving the coded signal, processing it and generating a coded response signal, and means in the software program for generating command signals to the computer to execute the program only if the coded response signal satisfies the predetermined security criteria.

According to yet another embodiment of the invention, a system is provided for verifying authenticity of data input to a central computer by a data entry device. The system includes a central computer, a plurality of data entry devices for providing input data to the central computer and a central security system, associated with the central computer for identifying the authority of the data entry device to input data to the computer. According to this invention, such prior art system is improved to enable the security system to also verify the authenticity of the data as well as the authority of the data entry device. This improvement comprises, in combination with the aforesaid system components, an external security device, programable by the central security system, which exchanges programmed user identifier data and other user-related data only with authorized data entry devices and with the central security system.

Any one of a wide variety of encoding techniques, which will be readily apparent to those skilled in the art, can be employed in the practice of the present invention For example, the software program could include instructions for generating random numbers. The random numbers are then transmitted to the ESD, which itself is programmed to generate response numbers, depending on the random numbers received. The software then processes these response numbers according to preselected computational criteria and if, but only if, these criteria are met, the software then signals the computer to complete execution of the program. For example, the software program can contain instructions which cause the response numbers received from the ESD to be summed and the execution command signal is generated by the software only if the sum reaches or exceeds a certain number after a predetermined number of random interrogation numbers have been sent to the ESD. This process could, for example, be reached several times before the command signal is generated to thereby increase the complexity, cost and time required to break the code.

At any rate, whatever particular encoding system is employed by a particular software publisher, once the coded system is selected, the method of operation of the security system of the invention is the same and is generally illustrated in FIG. 1.

As shown in FIG. 1, the software programs 1 are loaded into the working memory of the computer and the program initially signals the computer 2 to begin execution of the program 3. After commencement of execution of the program 3, instructions 4 in the program cause the software to transmit the preselected interrogation code to the ESD 5. The interrogation code 6 is received by the ESD 7 and processed and a response code 8 is transmitted 9 to the software program. Instructions 10 in the program cause the response to be analyzed 11 by the software and, if the response is correct, signals 12 are generated by the software which cause completion of the execution of the program 13. On the other hand, if the response signals 10 are not recognized as valid by the program, instructions 14 are generated by the program which cause the computer to cease execution of the program.

According to a further embodiment of the method of the invention, the "invalid" signals 14 can actually command the program to erase itself or can scramble the program in such fashion that it is practically impossible to even determine what the "invalid" signal 14 was.

FIG. 2 illustrates yet another embodiment of the invention in which an electronic security device is utilized in conjunction with a computer system in accordance with the invention. The computer 20 will normally contain a working memory 21 and logic or CPU 22 and will be used in connection with peripheral equipment which includes a data input terminal 23, permanent memory 24 and data display 25. Data 26 can be input from the terminal 23 into either the working memory 21 or the registers of the CPU 22. A program 27 stored in the permanent memory 24 is input to the working memory 21. Program instructions and/or data 28 are input to the logic from the working memory 21. The output 29 of the logic 22 can be input to the data display 25, the working memory 21 and/or the permanent memory 24.

In accordance with the broadest aspects of the present invention, the working memory 21 sends interrogation instructions 28 to the logic 22 which, in turn, sends interrogation signals 30 to an ESD 31 through any suitable I/O port. The ESD 31 processes interrogation signals 30 and sends response signals 32 through the logic 22 to the working memory 21. If the working memory 21 does not recognize these response signals as valid, it will send instructions 28 to the logic, commanding that execution of the program be stopped. If the working memory recognizes the response signals 32 as valid, it will send instructions 28 to the logic to complete execution of the program.

Having described my invention in such terms as to enable those skilled in the art to understand and practice it, and having described the presently preferred embodiments thereof,

I claim:

1. A data processing system, including means for verifying the authority of data-entry devices to input data and the authenticity of such data, said system comprising, in combination:

(a) a central data-processing computer;
  (b) a plurality of data-entry devices connected to said central computer for providing input data thereto;
  (c) a central security system, connected to said central computer for identifying said data-entry devices and verifying that such devices are authorized to input data to said central computer; and
  (d) a programmable external security device connected to at least one of said authorized data-entry devices, programmed by said central security system to exchange user-identifier and user transaction-related data with said data-entry device and said central security system.